United States Patent Office 3,552,803
Patented Jan. 5, 1971

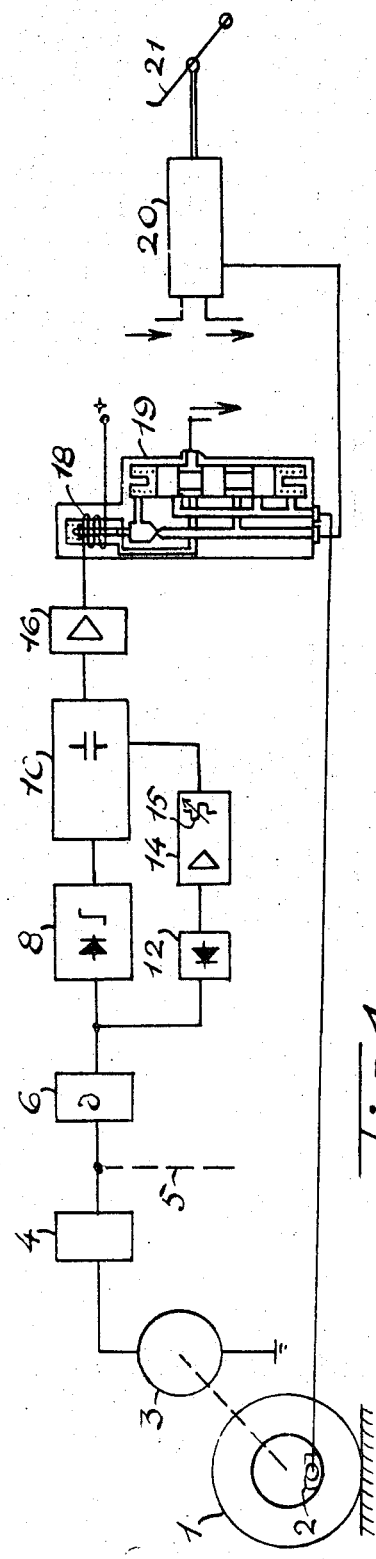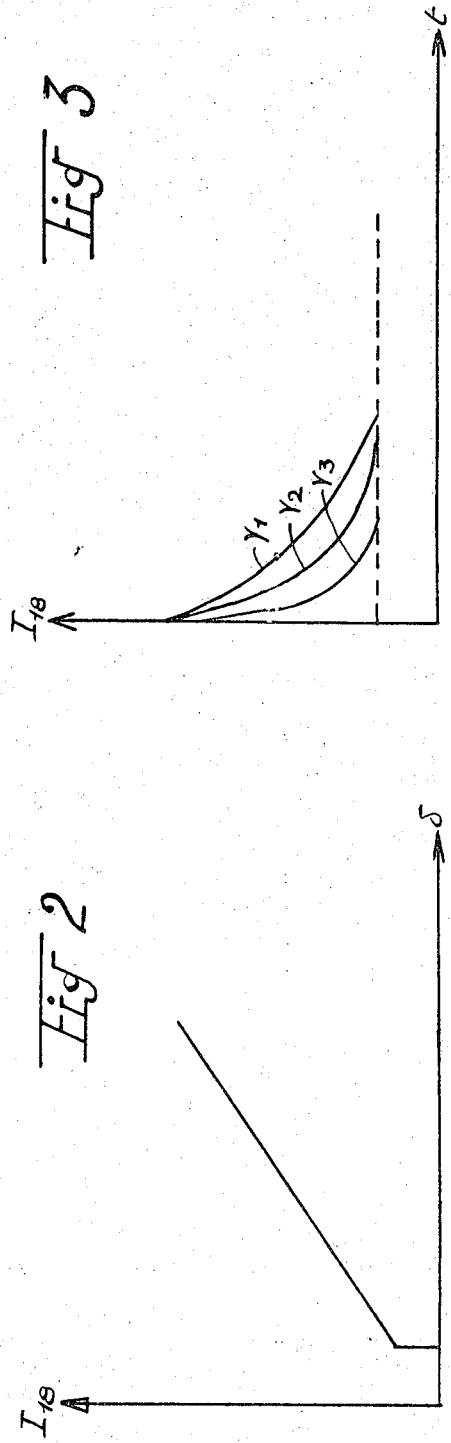

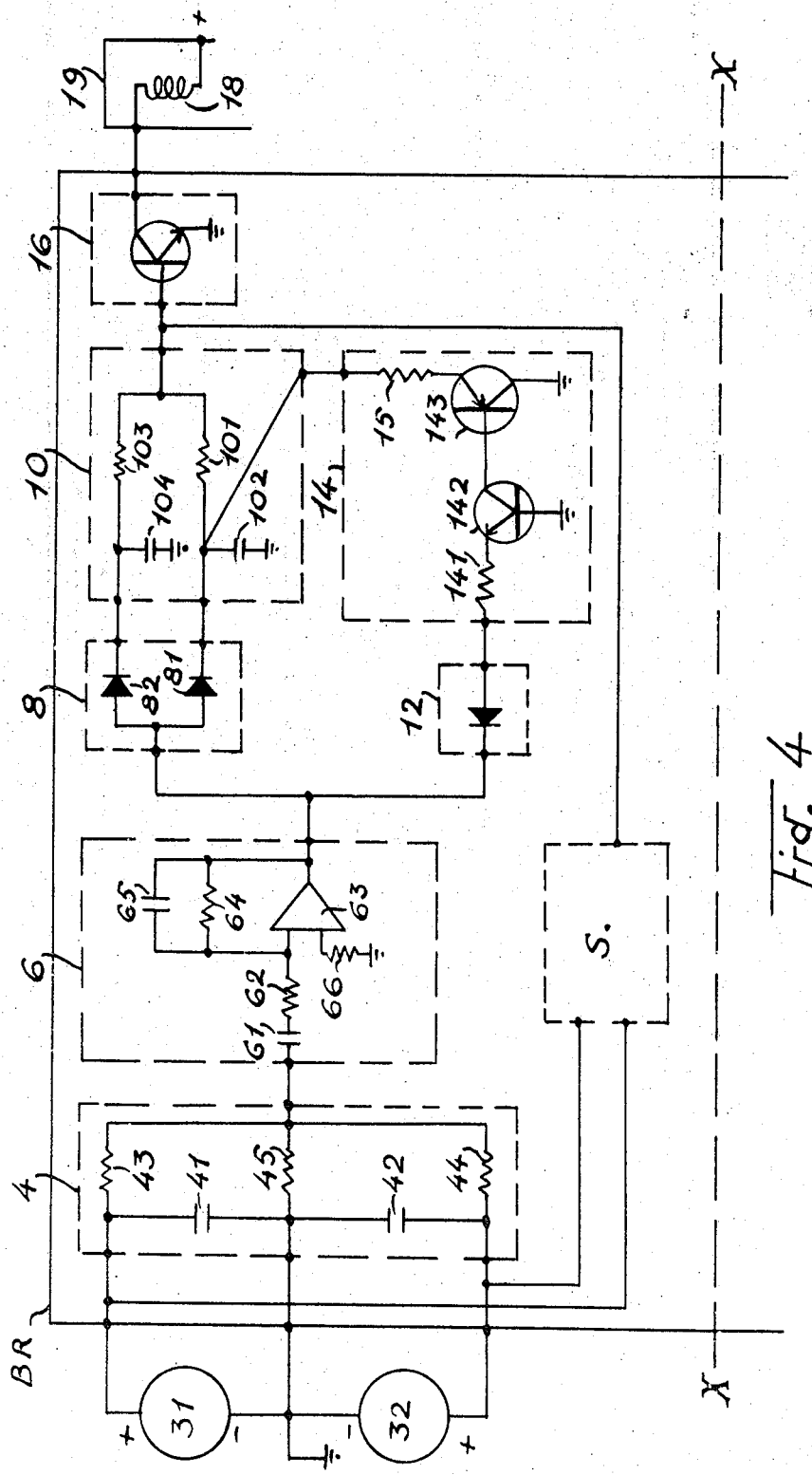

3,552,803
SYSTEM FOR CONTROLLING THE BRAKING
MEMBERS OF A VEHICLE ON WHEELS
René Lucien, Neuilly-sur-Seine, France, assignor to
Societe Anonyme dite: Messier, Paris, France
Filed Jan. 16, 1969, Ser. No. 849,224
Claims priority, application France, Jan. 17, 1968,
136,432
Int. Cl. B60t 8/08
U.S. Cl. 303—21                5 Claims

ABSTRACT OF THE DISCLOSURE

In a vehicle on wheels with hydraulic braking, a system for reducing the braking order given by the pilot as a function of the deceleration of the braked wheels due to their braking and then as a function of their acceleration due to the reduction. The system comprises, for each braked wheel, a device adapted to supply a signal proportional to the speed of the braked wheel, and a differentiator circuit controlled by at least one such signal, which gives a signal measuring the acceleration. A first uni-directional voltage-threshold circuit is controlled by the acceleration signal and produces an output signal only if the acceleration signal corresponds to a deceleration having an amplitude exceeding a selected value, and an impedance network comprising at least one capacitance is charged by the output signal of the first uni-directional circuit. A second uni-directional circuit is controlled by the acceleration signal and produces an output signal only if the acceleration signal corresponds to an acceleration. An amplifier with impedances of which at least one automatically decreases with the input signal to the amplifier, is controlled by the output signal of the second uni-directional conductor, which discharges the capacitance of the impedance network through the impedance of the amplifier, and a circuit is controlled by the voltage of the capacitance and operates a pressure-reducing electro-valve to proportionally reduce the braking pressure ordered by the pilot.

---

The present invention relates to an improved system for controlling the braking members of a vehicle on wheels, this system being characterized in that it corrects the braking order as a function of the deceleration and of the acceleration of the braked wheels of the vehicle, these values being representative of the conditions of adhesion to the ground.

There will first be recalled certain known data referring to the braking of a wheel:

(1) For a given braking torque applied by the pilot, the deceleration δ of a braked wheel is a function of its adhesion on the ground. Numerous braking controllers utilize this fact in order to act on the braking pressure, either fully or not at all, or gradually.

(2) The re-starting of a wheel released following the beginning of a slip or skid is also a function of the adhesion on the ground. The acceleration γ of the wheel thus gives an indication of this adhesion.

(3) The re-application of the braking torque on a wheel which is starting-up after the beginning of a slip must take into account the rate at which it is being run up to speed, failing which a still greater slip of the wheel will again be rapidly caused.

In consequence, the invention has for its object a braking control such that, for an order given by the pilot, the braking pressure is reduced if required, proportionately to the deceleration of the braked wheel, and such that the time of restoration of braking pressure in the following phase is adjusted so as to provide for a further skid.

More precisely, the invention has for its object a braking control of this kind, in which the said adjustment of the restoration of braking pressure is a function, on the one hand of the deceleration of the wheel during the preceding phase in which it has skidded, which thus takes into account the magnitude of the loss of speed to which it has been subjected, and on the other hand of the acceleration of the wheel during its re-starting, which takes account of its adhesion on the ground at the instant considered.

Briefly, according to the invention, each braked wheel is provided with a device which supplies a signal proportional to the speed of the wheel, this signal (or a signal which is a function of several such signals for example two), is sent into a differentiating circuit, the output signal from which is transmitted, when it corresponds to a deceleration having an amplitude which exceeds a value chosen by at least one uni-directional conductor with a voltage threshold, to a network of impedances comprising at least one capacitance charged by the said signal, and when it corresponds to a deceleration, by at least one uni-directional conductor to an amplifier which discharges the said capacitance or capacitances through impedances, of which at least one is automatically variable and decreases with the said signal, the said network controlling a circuit which supplies the coil of a pressure-reducing electro-valve which proportionately reduces the pressure sent to the brake. The said discharge impedances for the capacitances preferably comprise the load impedance of the said amplifier and its internal output resistance, for example the emitter-collector resistance of a transistor, which decreases with the input acceleration signal of the said amplifier.

The pressure-reducing electro-valve employed in accordance with the invention forms the subject of French Pat. No. 135,940 filed on Jan. 15, 1968 in the name of the present applicant. This apparatus converts the electric current which it receives to a reduction of the hydraulic pressure actuating the brakes, this conversion being effected proportionately. This apparatus will not be further described.

The invention will now be described with reference to the accompanying drawings, given by way of example and not in any limitative sense.

In these drawings:

FIG. 1 is a functional block diagram illustrating the principle of the invention;

FIGS. 2 and 3 show the evolution of the braking pressure, FIG. 2 as a function of the deceleration of the braked wheel, and FIG. 3 as a function of the time and for various values of acceleration;

FIG. 4 is a diagram of one form of embodiment of the invention.

Referring now to FIG. 1, the braked wheel 1, with its hydraulically-operated brake 2 drives a device 3 for the electrical measurement of its speed, for example a direct-current tachometer generator, as shown. This signal is transmitted to an adaptor 4 which serves at the same time as a filter.

At the output of the adaptor 4, this signal, to which there are added, when required, the analogous signals arriving over the line 5, is applied to the input of a time differentiator device 6. The output of the differentiator 6 is conveyed, directly as shown or through the intermediary of an amplifier (described later) to the input of a unit 8 having at least one uni-directional conductor with a voltage threshold, which only permits the passage of the signals corresponding to a deceleration which exceeds a pre-determined value.

The output signal from the unit 8 is applied to an impedance network 10 comprising at least one capacitance and resistances and/or inductances, the said capacitance being charged by the said signal. The output of the differentiator 6 is again connected, directly or through the intermediary of an amplifier, to the input of a unit 12, comprising at least one uni-directional conductor which only permits the passage of the signals corresponding to an acceleration.

The output signal from the unit 12 is sent to an amplifier 14, in which the output resistance 15, comprising at least one impedance which decreases with the said signal, for example a load resistance and a transistor emitter-collector resistance, is connected to the impedance network 10 and serves as a variable discharge resistance, in co-operation with certain impedances of this network, of the capacitance or capacitances of this network. The output signal of the network 10, taken from an appropriate point of this network, controls an amplifier 16, the output current of which is sent into the coil 18 of a pressure-reducing electro-valve 19. This electro-valve receives from a distributor 20 the braking pressure controlled by the brake pedal 21 and transmits it, after reduction if the current passes through its coil 18, to the brake 2 of the wheel 1.

The operation of the regulation device is as follows. The vehicle having a given speed $\omega$, the pilot effects braking by means of the pedal 21. This results in the admission of hydraulic pressure to the electro-valve 19, and this pressure is admitted to the brake 2 since the electro-valve receives no electric signal. This pressure results in a braking torque which will impress a deceleration $\delta$ on the wheel 1.

If, due to the adhesion between the wheel and the ground, the permissible braking torque is greater than or equal to the braking torque applied by the brake, the wheel has no tendency to slip or skid. The deceleration $\delta$ of the wheel will therefore substantially correspond to the deceleration of the vehicle. Because it is not necessary in this case to carry out a correction of the braking pressure, the output signal of the differentiator 6 is rendered inoperative by the voltage threshold provided for the uni-directional conductor or conductors of the unit 8. The system according to the invention does not come into action. The said threshold is regulated in such manner as not to cause any regulation of the braking pressure when the vehicle, at full braking, is running on ground having very good adhesion. To sum-up, in this case the pilot himself regulates the braking pressure in the brake.

On the other hand, if, due to an excessively-low adhesion between the wheel and the ground, the permissible braking torque is lower than the braking torque applied by the brake, the wheel will begin to slip, with a very high instantaneous deceleration. The signal at the input of the unit 8 exceeds the said voltage threshold. The unit 8 charges the capacitance or capacitances of the network 10 and the latter puts the amplifier 16 into operation, energizing the coil 18 of the electro-valve 19 (see FIG. 2), which reduces the pressure in the brake 2 proportionally to the signal received. The wheel 1 can therefore again be run-up to speed.

The signal derived from the speed as a function of time, that is to say the output signal of the differentiator 6, will therefore change in sign after passing through zero. This passage through zero will not however result, at the level of the coil 18 of the electro-valve 19, in the disappearance of the regulation signal (which would have the unfortunate consequence of the admission of full pressure to the brake). This signal in the coil 18 is maintained by the amplifier 16 which continues to cause the operation of the capacitance or capacitances of the network 10. This maintenance of the braking pressure thus permits the wheel to run-up to speed again.

It follows that the differentiator unit 6 supplies at its output an acceleration signal which is transmitted by the uni-directional conductor unit 12 to the amplifier 14 and this latter discharges the capacitance or capacitances of the network 10. This discharge is effected through some of the impedances of the network 10 and through the variable output resistance 15 of the amplifier 14. In more detail, the law governing the restoration of pressure to a brake must take into account the conditions of adhesion between the wheel and the ground. In fact, on ground with a good adhesion, the acceleration of the wheel will be high and its run-up to speed will be rapid (curve $\gamma_3$ of FIG. 3). It is therefore essential that the restoration of pressure should also be rapid. On the other hand, on ground having a low adhesion, when slipping begins, the wheel will have lost much more speed and its acceleration will be lower (curve $\gamma_2$ or even $\gamma_1$ of FIG. 3). Its run-up to speed will therefore be definitely longer. It is therefore essential that the restoration of pressure should also be longer; it is for this purpose that the said resistance 14 is variable. The higher the acceleration signal supplied by the differentiator 6, the more rapid is the discharge of the capacitances of the network 10.

Furthermore, not only is the desired operation thus obtained, but also the whole of the device makes it possible to obtain a regulation of the braking pressure.

In fact, on ground of low adhesion, due to the slower restoration of pressure in the brakes, the wheels will again begin to skid before this pressure has reached its maximum. This further slipping will thus cause a fresh release of the brakes and the cycle will be repeated until the vehicle stops.

By way of non-limitative example of the application of the prinicple of regulation of braking which has just been described, a construction of the device according to the invention will now be described below for a vehicle with four braked wheels, associated together in pairs, it being understood that the invention is applicable to any number whatever of braked wheels associated together or not in any desired number.

This construction is described with reference to FIG. 4. It comprises two sets of members, one for each pair of wheels which are identical with each other. For the sake of clearness, FIG. 4 shows only one of these two sets, and would have to be completed symmetrically with the broken line X—X in order to show the whole.

FIG. 4 thus shows two tachometer generators 31 and 32, one half of a regulation box BR containing the operating units according to the invention for the two corresponding wheels and the coil 18 of the corresponding electro-valve. The regulation box BR further contains an electrical safety system S which is known per se, and which completely releases the brakes of one wheel if this latter becomes accidentally locked, as will be described later.

For each pair of wheels, the two generators 31 and 32 are coupled in parallel to the adaptor 4. The output signal of each generator is filtered by the condensers 41 and 42 and by the resistances 43 and 44, the resistance 45 being a load resistance connected in parallel to the two generators, so as to eliminate the background noise of the generators and to adapt their outputs.

The output voltage taken at the terminals of the resistance 45 is sent to a conventional differentiator 6 which comprises:

A condenser 61 in series with a resistance 62;
An operational amplifier 63 with reverse reaction by a resistance 64 in parallel with a stabilizing condenser 65.

The inputs of this amplifier 63 are connected, one to the assembly 61–62 described above, and the other to earth through a resistance 66.

The output signal of the amplifier 63 is sent:
(1) to the anode of one threshold diode 81, the cathode of which is connected to a resistance 101 of the impedance network 10 and to a condenser 102 of the same network;
(2) to the anode of another diode 82 having the same threshold as the diode 81, and the cathode of which is connected to a resistance 103 and to a condenser 104;
(3) to the cathode of a diode 12, the anode of which is connected by a resistance 141 to the emitter of a transistor mounted on a common base 142 and supplying the base of a transistor 143, the collector of which is connected to earth and the emitter connected by a resistance 15 to the common point of the diode 81, the resistance 101 and the condenser 102, and which shunts this latter proportionally to the mean acceleration of the wheels as they again begin to run.

The network 10 of the construction described above thus comprises two resistances 101 and 103 and two capacitances 102 and 104. However, as has already been explained, the invention provides for a network comprising a number of capacitances other than zero, any desired number of resistances and any desired number of inductances.

The output signal from the network 10, taken from the comon point of the resistances 101 and 103, is applied to the base of a transistor 16, the emitter of which is connected to earth, while the collector is coupled directly to the coil 18 of the electro-valve.

The operation of this embodiment of the invention shown in FIG. 4 is of course the same as that described with reference to the operating block diagram shown in FIG. 1, to which the following details will be added.

When the braking applied by the brakes is greater than that which is permissible from the point of view of adhesion, the wheels begin to slip with a large deceleration δ. In this case, each differentiator 6 will deliver a current greater than the threshold of the diodes 81 and 82. This current will cause:

(1) Release of the transistors 16 which corresponds to the delivery into each coil 18 of the pressure-reducing electro-valves 19 of a current proportional to the value of the deceleration of the wheels. Through the action of the electro-valves 19, this current will cause a drop in pressure in the brakes which is proportional, as already explained;
(2) The charging of the condenser 102, proportionately to the signal delivery by the differentiators;
(3) The changing of the condensers 104, also proportionately to the signal of the differentiators.

In consequence of the release of braking, each wheel will be able to run-up to speed but as already explained, when the signal delivered by the differentiators 6 ceases, the condensers 102 and 104 maintain the potentials of the bases of the transistors 16, which maintains a regulating signal in the coils 18, and therefore which limits the braking pressure and permits the wheels to run-up to speed again. In consequence, the differentiators 6 then deliver an acceleration signal which acts through the diodes 12 to release the transistors 142, and therefore also the transistors 143. The latter then allow the condensers 102 to discharge through the resistances 15 and the condensers 104 to discharge through the resistances 103, 101 and 15. The bases of the transistors 16 follow these discharges; this permits a restoration of pressure in the brakes following a law which is similar to the law of discharge of a condenser through a resistance. More precisely, this law results, under the control of the variable conductance of the transistor 143, from the simultaneous discharges of the condenser 102 through the load resistance 15 and of the transistor 143, and of the condenser 104 through the resistances 103 and 101 plus the same resistance 15 and transistor 143, the output signal being taken from the common point of the resistances 101 and 103. The number of parameters which can be chosen freely makes it possible to obtain any desired law for the restoration of pressure in the brakes.

The regulation box BR further comprises a safety circuit S which is provided with a setting system arranged in such manner that below a given vehicle speed V it is inoperative, while above this speed it is operative. This speed V is measured by adding together the currents of the generators 31 and 32. This arrangement makes it possible to admit the maximum braking pressure to the brakes when the vehicle is stationary, and it also facilitates evolutions of the vehicle at low speed when differential braking is carried out (braking of one side of the vehicle or the other).

When the vehicle is running at a speed higher than V, if during braking the speed of a wheel becomes less than a given speed $\omega'_c$ (where $\omega'_c < V$), the safety circuit delivers an electric signal which causes the complete release of the corresponding brake and of the brake which is conjointly operated therewith. This permits the running-up to speed of the wheel which had started-up locked.

Finally, if in spite of the complete braking release order given to a wheel which has a speed less than $\omega'_c$ (the speed of the vehicle being higher than V), this wheel, for one reason or another, does not run-up and remains at a speed less than $\omega'_c$, the anti-locking safety circuit comprises a device which re-applies the corresponding brake and that which is conjugated with it, by application of pressure at the end of a certain time T by rendering this circuit inoperative for the corresponding wheel up to the stoppage of the vehicle. For a vehicle fitted with pneumatic tyres, this permits the retention of the possibility of braking when a tyre has burst and when for that reason the corresponding wheel no longer turns.

What I claim is:
1. In a vehicle on wheels with hydraulic braking, a system reducing the braking order given by the pilot as a function of the deceleration of the wheels braked due to their braking and then as a function of their acceleration due to said reduction, comprising, for each braked wheel a device adapted to supply a signal proportional to the speed of said braked wheel, a differentiator circuit controlled by at least one such signal, which supplies a signal measuring the acceleration, a first uni-directional voltage-threshold circuit controlled by said acceleration signal which supplies an output signal only if said acceleration signal corresponds to a deceleration having an amplitude exceeding a selected value, an impedance network comprising at least one capacitance charged by the output signal of said first uni-directional circuit, a second uni-directional circuit controlled by said acceleration signal, which supplies an output signal only if said acceleration signal corresponds to an acceleration, an amplifier comprising impedances of which at least one decreases automatically with the input signal to said amplifier, controlled by the output signal of said second uni-directional conductor which discharges said capacitance of said impedance network through said impedance of said amplifier, a circuit controlled by the voltage of said capacitance, and a pressure-reducing electro-valve controlled by the output signal of said circuit and proportionately reducing the braking pressure ordered by the pilot.

2. A system as claimed in claim 1, in which the impedances of said amplifier comprise its load impedance and its internal output resistance.

3. A system as claimed in claim 1, in which said first uni-directional voltage-threshold circuit comprises two threshold diodes actuated on their anodes connected in parallel, said impedance network comprising two condensers each between one diode cathode and earth and two resistances connected in series between said diode cathodes, the output of said network being taken from the common point of the two resistances.

4. A system as claimed in claim 1, said second uni-directional circuit comprising a diode operated on its cathode, and said amplifier being an amplifier without reversal of phase, the load resistance of which is fed by a capacitance of said network.

5. In a vehicle on wheels with hydraulic braking, a system reducing the braking order given by the pilot as a function of the deceleration of the braked wheels due to their braking and then as a function of their acceleration due to said reduction, comprising, for each braked wheel, a tachometer generator supplying a signal proportional to the speed of this braked wheel and a filter comprising a condenser connected in parallel and a series resistance, a load resistance connected to said series resistances of the two filters of two wheels on the same axle, a differentiator circuit comprising a condenser connected to said load resistance of the two filters, a resistance connected to said condenser and a reverse feedback amplifier, a first uni-directional circuit with a voltage threshold comprising two threshold diodes connected by their anodes to said reverse-feed back amplifier, an impedance network comprising two condensers each connected between a cathode of said diodes and earth and two resistances connected in series between the cathodes of said diodes, a second uni-directional circuit comprising a third diode connected by its cathode to said reverse feed-back amplifier, an amplifier comprising a first transistor mounted on a common base, a resistance between the anode of said third diode of said second uni-directional circuit, a second transistor with its collector connected to earth, the base connected to the collector of said first transistor, and a resistance connected between the emitter of said second transistor and the cathode of said first diode of said first uni-directional circuit, a circuit comprising a third transistor with its emitter connected to earth, the base connected to the common point of the two resistances of said impedance network, an electro-distributor comprising an operating coil connected to the collector of said third transistor, and a safety device having its two inputs each connected to the input of one of said filters, and having its output connected to the base of said third transistor.

References Cited
UNITED STATES PATENTS

| | | | |
|---|---|---|---|
| 3,017,145 | 1/1962 | Yarber | 303—21 |
| 3,245,727 | 4/1966 | Anderson et al. | 303—21 |
| 3,498,682 | 3/1970 | Mueller et al. | 303—21 |

DUANE A. REGER, Primary Examiner

U.S. Cl. X.R.
244—111; 303—20